United States Patent [19]
Young et al.

[11] Patent Number: 5,978,192
[45] Date of Patent: Nov. 2, 1999

[54] SCHMITT TRIGGER-CONFIGURED ESD PROTECTION CIRCUIT

[75] Inventors: William R. Young; Gregg D. Croft, both of Palm Bay, Fla.

[73] Assignee: Harris Corporation, Melbourne, Fla.

[21] Appl. No.: 08/964,672

[22] Filed: Nov. 5, 1997

[51] Int. Cl.⁶ .................................................. H02H 9/00
[52] U.S. Cl. ......................... 361/56; 361/111; 361/117; 361/118; 361/127
[58] Field of Search .................. 361/56, 91, 111, 361/117, 118, 127, 58

[56] References Cited

U.S. PATENT DOCUMENTS 5,463,520  10/1995  Nelson ........................................ 361/56

*Primary Examiner*—Stephen W. Jackson
*Attorney, Agent, or Firm*—Charles E. Wands

[57] ABSTRACT

A Schmitt trigger-configured overvoltage protection circuit has a hysteresis turn-on, turn-off characteristic that minimizes its sensitivity to noise, and is effective to protect an integrated circuit against a DC overvoltage condition, and electrostatic discharge-based transients, while allowing 'hot' insertion of a device containing the clamping circuit into an already powered-up system. The protection circuit employs a reference device, such as a Zener diode, that enables the clamping circuit trigger threshold to be set at a value that is independent of the power supply voltage.

20 Claims, 4 Drawing Sheets

SCHMITT TRIGGER-CONFIGURED ESD PROTECTION CIRCUIT

FIELD OF THE INVENTION

The present invention relates in general to a mechanism for protecting integrated circuits against potentially destructive transients, and is particularly directed to a hysteresis-based, Schmitt trigger-configured, power supply clamping circuit that is effective to protect an integrated circuit against both electrostatic discharge (ESD) events, as well as large power supply overvoltage conditions, while allowing 'hot' insertion of a circuit card into an already powered-up system.

BACKGROUND OF THE INVENTION

In order to protect integrated circuits against the potentially destructive effects of large voltage transients, such as those caused by electrostatic discharge (ESD) events, it has become common practice to provide various forms of transient-triggered ESD protection circuits, such as a power supply clamping circuit diagrammatically shown at 10 in FIG. 1. As shown therein a (CMOS, bipolar or BiMOS) integrated circuit 11 is powered by respective (Vdd and Vss) power supply terminals/rails 12 and 14. In addition to coupling reverse-connected protection diodes D1/D2 and D3/D4 between respective signal input and output pins/ports 21 and 23 and the supply rails, a voltage transient (dv/dt)-responsive clamp circuit 40, typical bipolar and MOS-configured examples of which are shown schematically in FIGS. 2 and 3, respectively, is coupled across the supply rails.

Each clamp circuit has first and second ports 41 and 42, coupled to the respective power supply terminals Vdd, Vss. Ports 41 and 42 are bridged by a resistor R1—capacitor C1 network 43, having a sense/control node 45 as a control input to the clamp circuit 40, shown as a Darlington-connected bipolar transistor pair Q1–Q2 in FIG. 2, and a CMOS inverter (Q1–Q2) driven output MOS device Q3 in FIG. 3.

In operation, a portion of a sensed ESD pulse is coupled via the discharged input capacitor C1 and resistor R1 to the sense node 45 and is used to turn on the switched components of the clamp circuit 40, so as to clamp the voltage applied across the circuit at a preset, tolerable value. Eventually, the capacitor C1 is charged to the voltage across ports 41 and 42, turning off the clamp circuit 40, and returning the circuit to its previous (inactive) state.

The values of the resistor—capacitor network 43 (i.e. its RC time constant) and the switching characteristics of the clamp circuit control how long the clamp circuit will conduct. This RC time constant is typically set at a value that is close to or slightly longer that of the ESD waveform (e.g., on the order of 150 ns for the standard human body model (HBM)), to ensure that the protection circuit will be active for a duration sufficient to discharge the entire ESD pulse. However, too long an RC time constant can present problems, if rapid voltage transitions occur across the clamp circuit during normal operation.

For example, if the part containing the integrated circuit 10 and its associated clamp circuit is connected across powered positive and negative supply rails (a 'hot' insertion), the clamp circuit may be subjected to a very rapid voltage transition. Such a rapid voltage transient may also be caused by inductive voltage drops across the part's bond-wires and lead frame during rapid current transitions. If the peak of the rapid voltage transient is high enough, it may turn on the protection circuit, which is undesirable during normal operation (although it may not be catastrophic, if the clamping circuit conducts for only a relatively abbreviated period of time, as governed by the RC time constant).

A further shortcoming of conventional overvoltage clamp circuits is their sensitivity to noise in the vicinity of their triggering threshold. Moreover, because these circuits have the potential to oscillate during an ESD transient event, they can take longer than necessary to discharge an ESD pulse. Such unwanted oscillation may occur, if the clamp circuit locally reduces the voltage on the supply rails fast enough to capacitively couple to the control node and reduce its voltage below the clamp threshold. The clamp circuit would then turn off; if the ESD pulse had not been fully discharged, however, the voltage at the supply terminals would begin to rise. This voltage increase would, in turn, couple to the control node and turn the clamp circuit back on—a cycle that could be repeated several times (oscillation).

SUMMARY OF THE INVENTION

In accordance with the present invention, the above-discussed problems of conventional ESD protection circuits are effectively obviated by a Schmitt trigger-configured overvoltage clamping circuit, having a hysteresis turn-on, turn-off characteristic that minimizes its sensitivity to noise, and is effective to protect an integrated circuit against a DC overvoltage condition, and electrostatic discharge-based transients, while allowing 'hot' insertion of a circuit card containing the clamping circuit into an already powered-up system.

As will be described, the protection circuit employs a reference device, such as a Zener diode, that enables the clamping circuit trigger threshold to be set at a value that is independent of the power supply voltage. In addition to a Zener diode, another implementation of a voltage reference may be employed as long as it provides a voltage reference that is independent of the supply voltage. Non-limiting examples of other voltage reference configurations include a serial string of diodes, a cascaded arrangement of diode-connected transistors and an emitter-collector punch-through-connected transistor arrangement. For each of these and other functionally equivalent voltage reference implementations, the voltage reference will be governed only by circuit manufacture processing and device geometry parameters, making operation of the clamping circuit independent of the power supply voltage.

The clamping circuit of the present invention may be configured for either DC mode operation or transient mode operation so as to protect an integrated circuit against a power supply rail overvoltage condition and electrostatic discharge-based transients. In accordance with a DC mode embodiments of the present invention, configured for DC operation, an input resistor of a voltage divider/clamp reference circuit is coupled between a power supply rail and an input node of a switched driver circuit, such as a CMOS inverter or a bipolar drive transistor. A clamping activation threshold reference device, such as a Zener diode, is coupled between the input node and another power supply rail. The switched driver circuit has an output node coupled to drive inputs of each of a supply rail-clamping transistor and a feedback transistor used to set the turn-off voltage level of the hysteresis characteristic of the protection circuit.

The feedback transistor is employed as a switched low impedance device that forms a voltage divider with the input resistor during the active state of the protection circuit. The characteristics of the feedback transistor are such that the supply rail voltage differential at which the inverter switches back to its previous, clamp-inactive, state is less than that for activating the clamping circuit. This reduced turn-off voltage ensures that, once triggered, the clamping circuit will stay on for a period of time sufficient to perform its intended clamping function, and will not be subject to noise such as an inductive noise voltage bounce that might inadvertently turn the clamp off. Namely, the reduced turn-off threshold provides the inverter switching characteristic with a hysteresis that minimizes its sensitivity to noise. The supply rail clamping transistor is a large geometry, large current device, having its drain-source path or collector-emitter path coupled between the supply rails, and is operative to pull current out of the power supply and clamp the power supply voltage to a value determined by its internal impedance.

In the absence of an overvoltage condition, the switched driver is initially in a first, inactive state, keeping the feedback and clamping transistors turned off. During this state, the voltage at the input node tracks the supply rail voltage up to the Zener value and is then clamped at that value by the Zener diode. As long as the positive supply rail to input node differential is less than the value at which inverter switches, the switched driver remains in its first, non-clamping state. However, for an excessive overvoltage condition, where the voltage on the supply rails exceeds the prescribed overvoltage threshold, the switched driver will switch, causing the voltage at its output node to change state, thereby simultaneously turning on each of the feedback and clamping transistors.

As the clamping transistor pulls current out of the power supply and clamps the power supply voltage to a value determined by its internal impedance, the feedback transistor pulls the voltage at the input node to a low value corresponding to that of a supply terminal plus a prescribed voltage offset associated with the feedback transistor (VDS for a MOSFET, VCE for a bipolar transistor), so as to reduce the voltage to which the supply rail differential must drop in order for the switched driver to switch back to its previous, non-clamping state, and providing the intended turn-on, turn-off hysteresis characteristic of the protection circuit. When the overvoltage condition that has given rise to the dynamic clamping action subsides, and the supply rail differential voltage decreases to the lower hysteresis threshold, the inverter switches state removing the drive to the feedback and clamping transistors and turning off the clamp.

In accordance with transient-based embodiments of the invention, the switching components of the hysteresis-based protection circuit are AC-coupled to the power supply rails through a time constant network (a resistor—capacitor RC) network. This RC network is operative to cause the protection circuit to be triggered or turned-on in response to an ESD pulse, such as that generated by a human body, electrical machinery, etc., which typically has a very fast rise time (e.g., on the order of hundreds of picoseconds) and a very large amplitude (which may be on the order of several thousand volts). The protection circuit thereafter shuts down the clamping action of the circuit after the overvoltage pulse drops below the reduced hysteresis threshold or at the expiration of a prescribed time interval corresponding to the time constant of the RC network and the switching characteristics of the clamp circuit, whichever occurs first. Incorporating a time-out controlled recovery or turn-off action as an adjunct to the hysteresis-defined turn-off condition, is very effective in preventing circuit damage or destruction as a result of prolonged power dissipation in the clamping state.

In each transient mode embodiment, the common connection of the input capacitor and the resistor of the RC network is coupled to the control input of an input drive device, such as a bipolar transistor or a CMOS inverter, having its major current flow path coupled in series with the clamping threshold reference device. The output of this input drive device is coupled to a switched driver as in the DC configuration. The output of the switched driver again supplies drive to a feedback transistor and a clamping transistor. The feedback transistor is coupled to the junction between the voltage reference device and the input drive device.

In operation, in the absence of an excessive overvoltage transient, the input drive device is turned-off, so that the remaining circuit switch components are turned off, or non-conductive. When an ESD pulse is coupled through the capacitor of the RC input network, it will turn the input driver on hard. This, in turn will simultaneously turn on each of the feedback and clamping transistors. Again, therefore, the large current drive provided by the clamping transistor pulls current out of the power supply and clamps the power supply voltage to a value determined by its internal impedance. At the same time, the turn on of the feedback transistor inserts a low impedance positive feedback circuit, in parallel with the reference device, lowering the reference voltage.

As in the DC embodiment, the positive feedback circuit serves to set the turn-off of the clamping circuit at a lower (turn-off) threshold than the turn-on threshold. It also improves the efficiency of the clamp in the discharging of the capacitor, so as to ensure that the clamping action of the protection circuit is effective for only a prescribed period of time. As noted above, the clamping action is terminated when the voltage on the control node drops below the reduced turn-off threshold, or at the expiration of the time out established by the time constant of the RC network and the switching characteristics of the clamp circuit. This serves to prevent an overvoltage condition that does not subside to the lower threshold voltage within the time constant period, from causing circuit damage or destruction that might otherwise result from prolonged power dissipation in the clamping state.

DETAILED DESCRIPTION

As described briefly above, the present invention effectively obviates the shortcomings of conventional ESD protection circuits by means of a hysteresis-based clamping circuit, in particular a Schmitt trigger-configured clamping circuit, having a reference device and a turn-on, turn-off hysteresis characteristic that minimizes its sensitivity to noise. These turn-on and turn-off thresholds should be set at values that exceed the normal maximum operating voltage.

The use of a reference device, such as a Zener diode, means that the clamping circuit trigger threshold may be fixed at a value that is independent of the power supply voltage. The voltage reference will be governed only by circuit manufacture processing and device geometry parameters, making operation of the clamping circuit deterministic. As will be described, the clamping circuit of the present invention may be configured for either DC mode operation (FIGS. 4–6) or transient mode operation (FIGS. 7–9), so as to protect an integrated circuit against a power supply rail overvoltage condition and electrostatic discharge-based transients. It should also be noted that in the description of the various non-limiting embodiments of the invention to follow, the polarities of the devices and associated voltages may be reversed, to provide protection circuit configurations that are complementarily equivalent to those shown.

Figure 1:
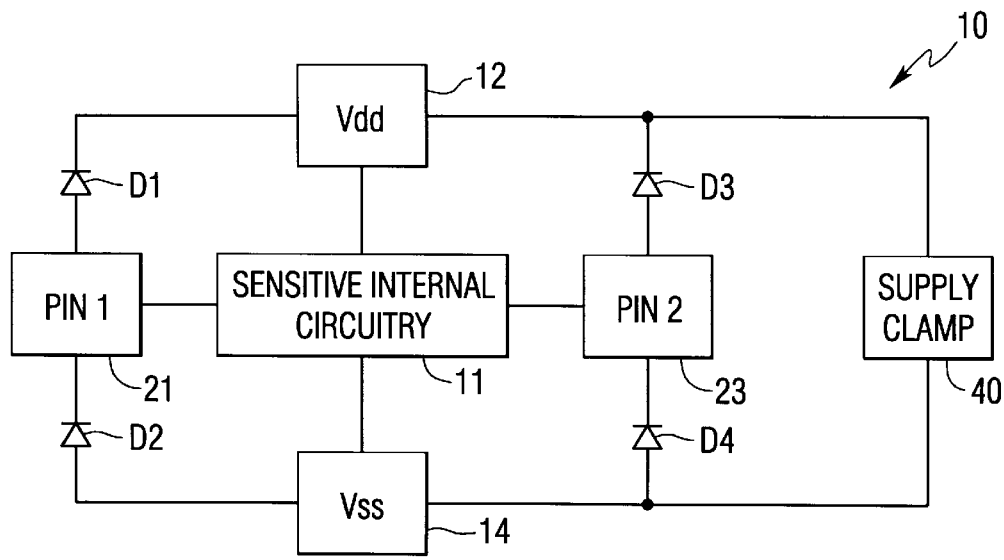
FIG. 1 diagrammatically shows a power supply rail-coupled clamping circuit for protecting an integrated circuit against potentially destructive effects of large voltage transients, such as those caused by electrostatic discharge (ESD) events.
Figure 2:
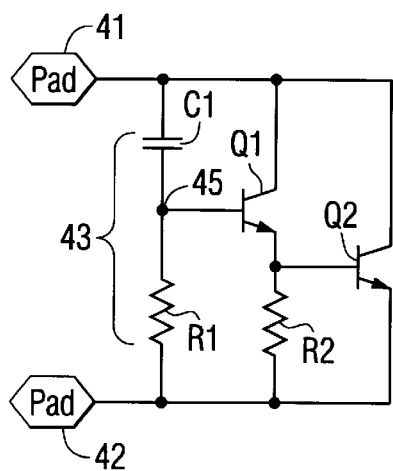
FIG. 2 shows a conventional bipolar Darlington-configured clamp circuit that may be employed in the supply clamp circuit of FIG. 1.
Figure 3:
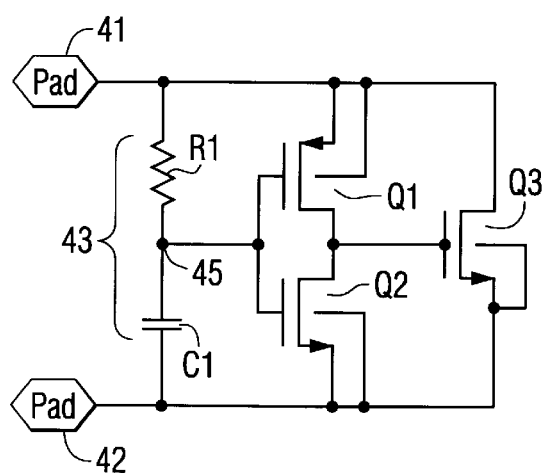
FIG. 3 shows a conventional CMOS device-configured clamp circuit that may be employed in the supply clamp circuit of FIG. 1.
Figure 4:
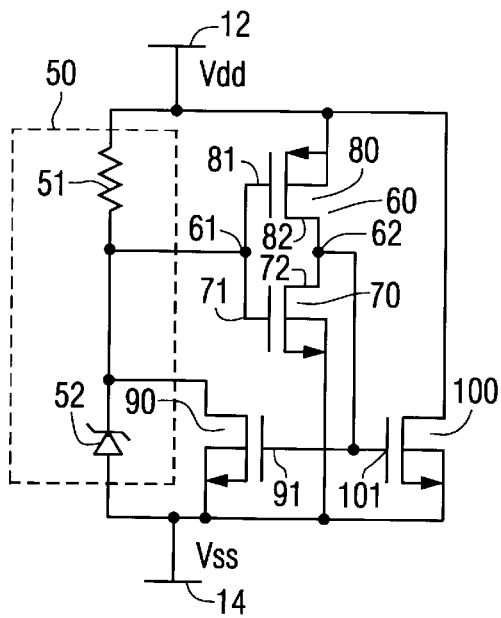
FIG. 4 diagrammatically illustrates a Schmitt trigger-configured IC protection circuit in accordance with a first, CMOS-configured embodiment of the present invention for DC mode of operation.

FIG. 4 diagrammatically illustrates a Schmitt trigger-configured IC protection circuit in accordance with a first, CMOS-configured embodiment of the present invention, which is intended for DC operation. As shown therein, an input resistor 51 of a voltage divider/clamp reference circuit 50 is coupled between the Vdd supply rail 12 and an input node 61 of a CMOS inverter 60. A voltage reference device, such as a Zener diode 52 as a non-limiting example, is coupled between the input node 61 and the Vss voltage supply rail 14.

The use of a voltage reference device, such as but not limited to an internal Zener diode, to define a point (a prescribed voltage level relative to the supply rail differential) at which the Schmitt trigger circuit is activated into the clamping mode means that the clamping circuit trigger threshold is independent of the power supply voltage. The voltage reference will be governed only by circuit manufacture processing and device geometry parameters of the reference device, making operation of the clamping circuit deterministic.

Were such a reference device not employed, the Schmitt trigger threshold could increase proportionally with supply voltage, preventing the input to the clamping circuit from ever reaching a clamping activation threshold during an ESD pulse. Since the voltage reference device allows the clamping threshold to be deterministically established, activation of the clamping circuit can be set at a value that is sufficiently above the nominal supply voltage, thereby allowing a circuit card or a device containing the clamping circuit to be 'hot' inserted into an already powered-up system, without triggering the clamping circuit.

As described above, the clamping circuit is designed to be activated at a prescribed overvoltage condition. For purposes of providing a non-limiting example, in the present embodiment, for a nominal operational voltage supply rail differential of 5V (e.g., Vdd=5V and Vss=GND), CMOS inverter 60 may be designed to switch at fifty percent of some prescribed supply rail overvoltage (e.g., twice that of 5V nominal or 10V), so that the Zener diode 52 may have a clamping voltage of 5V.

This means that the input node 61 will follow the Vdd supply rail voltage up to five volts and then clamp its voltage at the Zener value. For an overvoltage condition, where the supply rail differential voltage goes beyond five volts, and reaches a value that is twice the clamped Zener value (5V) at input node 61, the CMOS inverter 60 will switch, causing the voltage at CMOS inverter output node 62 to change state (go from a low to high), as will be described.

The CMOS inverter circuit 60 is shown as being comprised of an N-MOSFET transistor 70 and an P-MOSFET transistor 80, having their source-drain current flow paths coupled in series between the Vdd supply rail 12 and the Vss supply rail 14. MOSFETs 70 and 80 have their respective gates 71, 81 connected in common to input node 61. The CMOS inverter output node 62 is coupled to their commonly connected drains 72–82, and to the gates 91 and 101 of respective N-MOSFETs 90 and 100. N-MOSFET 90 has its drain-source path coupled between the CMOS inverter input node 61 and the Vss supply rail 14, and is used as a switched low impedance device that forms a voltage divider with resistor 51 during the active (clamping) state of the protection circuit.

The characteristics of N-MOSFET 90 are such that the supply rail voltage differential at which the inverter 60 reverts back to its previous, clamp-inactive, state is preferably less than that (10V in the present example) for activating the clamping circuit, but also exceeds the difference between normal power supply voltages of the power supply rails. This reduced turn-off voltage (e.g., 6V, as a non-limiting example) ensures that, once triggered, the clamping circuit will stay on for a period of time sufficient to perform its intended clamping function, and will not be subject to noise such as an inductive noise voltage bounce that might inadvertently turn the clamp off. Namely, the reduced turn-off threshold provides the inverter switching characteristic with a hysteresis that minimizes its sensitivity to noise.

N-MOSFET 100 is a large geometry, large current device, having has its drain-source path coupled between the Vdd supply rail 12 and the Vss supply rail 14. N-MOSFET 100 serves as the principal clamping element during the active state of the ESD protection circuit. The large current drive provided by N-MOSFET 100 serves to effectively pull current out of the power supply and clamps the power supply voltage to a value determined by the internal impedance of N-MOSFET 100.

In operation, in the absence of an overvoltage condition, the inverter 60 is initially in a first, low output state, keeping N-MOSFETs 90 and 100 and their associated clamping action turned-off. During this state, the voltage at node 61 tracks the supply rail voltage up to the Zener value (here 5V) and is then clamped at that value by the Zener diode 52. As long as the supply rail differential is less than the value at which inverter 60 switches (e.g., 50% of the (10V) supply rail differential, as described above), the CMOS inverter 60 remains in its first, non-clamping state. However, for an excessive overvoltage condition (where the voltage on the supply rails exceeds the prescribed overvoltage threshold— here 10V), the CMOS inverter 60 will switch, causing the voltage at output node 62 to change state (go high), thereby turning on each of N-MOSFETs 90 and 100 hard.

As noted previously, the large current drive provided by N-MOSFET 100 pulls current out of the power supply and clamps the power supply voltage to a value determined by the internal impedance of N-MOSFET 100. At the same time, the turn on of N-MOSFET 90 pulls the voltage at node 61 to a low value (that of Vss supply terminal 14 plus the VDS of N-MOSFET 90), so as to reduce the voltage to which the supply rail differential must drop in order for CMOS inverter to switch back to its previous, non-clamping state, and providing the intended turn-on, turn-off hysteresis characteristic of the protection circuit.

When the overvoltage condition that has given rise to the dynamic clamping action subsides, the supply rail differential voltage will decrease. Since N-MOSFET 90 is turned on, and thereby provides a low impedance that is part of a voltage divider with resistor 51, the CMOS inverter will not switch state until the subsiding supply rail differential reaches a reduced value (e.g., 6V) that is less than that for activating the clamping circuit. (In the present example, the on-impedance of N-MOSFET 90 is chosen such that the voltage value at node 61 is 3V, when the supply rail differential voltage reaches 6V). When the supply rail differential drops to this value the CMOS inverter switches state (its output node 62 goes low), removing the gate drive to N-MOSFETS 90 and 100, and turning off the clamp.

Figure 5:
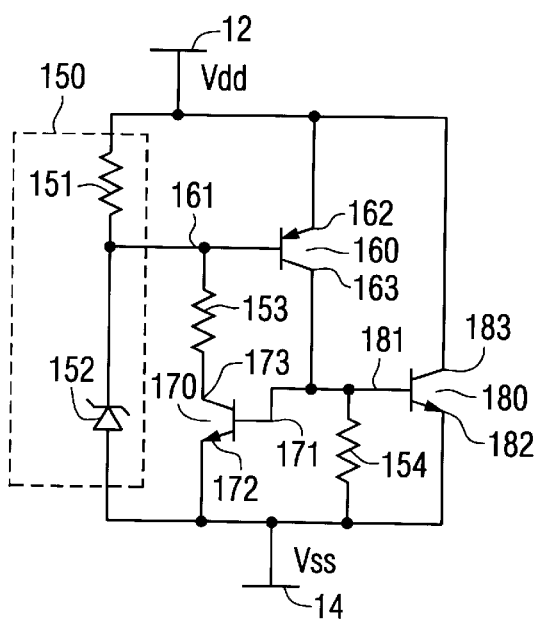
FIG. 5 diagrammatically illustrates a Schmitt trigger-configured IC protection circuit in accordance with a second, bipolar-configured embodiment of the present invention for DC mode of operation.

FIG. 5 diagrammatically illustrates a Schmitt trigger-configured IC protection circuit in accordance with a second bipolar-configured embodiment of the present invention, which, like the first embodiment, is designed for DC operation. As shown therein, an input resistor 151 of a voltage divider/clamping circuit 150 is coupled between the Vdd supply rail 12 and an input or sense node at the base 161 of an bipolar PNP transistor 160. As in the first embodiment, a voltage reference device, shown as a Zener diode 152, is coupled between the input node 161 and the Vss voltage supply rail 14, and is employed to set a voltage level relative to the supply rail differential at which the Schmitt trigger circuit is activated into the clamping mode.

PNP transistor 160 has its emitter 162 coupled to the Vdd supply rail 12 and its collector 163 coupled to the bases 171 and 181 of each of NPN transistors 170 and 180, respectively. The respective emitters 172 and 182 of NPN transistors 170 and 180 are coupled to the Vss supply rail 14. The collector 173 of the NPN transistor 170 is coupled through a collector resistor 153 to input node 161, while the commonly connected bases 171 and 181 of NPN transistors 170 and 180 are coupled through a bias resistor 154 to the Vss supply rail 14.

As in the first embodiment, the sense node input voltage for PNP transistor 160 to turn-on hard may be established such that PNP transistor 160 turns-on when the Vdd voltage reaches the Zener voltage of Zener diode 152 plus the Vbe of transistor 160 (e.g., $V_{Zener}$=5V of Zener diode 152 plus 0.7V Vbe of PNP transistor 160 or Vdd=5.7 V). Similar to the N-MOSFET 90 in the DC embodiment of FIG. 4, NPN transistor 170 is used as a switched low impedance device that activates a voltage divider formed by resistors 151 and 153 during the active state of the clamping circuit. The characteristics of this voltage divider are such that the supply rail voltage differential at which PNP transistor 160 is turned-off (e.g., 3V) is less than that for activating the clamping circuit, so that the Schmitt trigger has the intended turn-on (clamp-active), turn-off (clamp-inactive) hysteresis switching characteristic.

Like N-MOSFET 100 in the embodiment of FIG. 4, NPN transistor 180 is a large current device, having its collector-emitter path 183–182 coupled between the Vdd supply rail 12 and the Vss supply rail 14, and serves as the principal clamping element during the active state of the protection circuit. Namely, when turned on hard by the collector output of PNP transistor 160, NPN transistor 180 pulls current out of the power supply and clamps the power supply voltage to a value determined by the internal impedance of the NPN transistor 180.

In operation, in the absence of an overvoltage condition, PNP transistor 160 is initially turned off, or non-conductive, keeping the base-emitter junctions of NPN transistors 170 and 180 at zero bias, and thereby their associated clamping action turned-off. During this state, the voltage at input node 161 tracks the supply rail voltage up to the Zener value (e.g., 5V) and is then clamped at that value by the Zener diode 152. PNP transistor 160 will turn on when the supply rail differential exceeds the Zener value of Zener diode 152 by the required turn-on Vbe of transistor 160 (e.g., 0.7V).

However, for an excessive overvoltage condition between power supply terminals 12 and 14, PNP transistor 160 is turned-on hard, so that its collector output supplies substantial base drive to NPN transistors 170 and 180, turning these transistor on hard. When this happens, the large current drive provided by NPN transistor 180 pulls current out of the power supply and clamps the power supply voltage to a value determined by the collector-emitter impedance of NPN transistor 180.

At the same time, since NPN transistor 170 is turned on hard, it provides a low impedance into a series circuit to the input node 161, formed of the collector-emitter $V_{SAT}$ resistance of transistor 170 and the resistance of resistor 153 in series with resistor 151, so as to reduce the voltage at which the clamp turns off. As in the embodiment of FIG. 4, PNP transistor 160 will not switch state until the subsiding supply rail differential reaches a reduced value (e.g., 3V) that is less than that for activating the clamping circuit. When the supply rail differential drops to the reduced base drive value for PNP transistor 160, transistor 160 is rendered non-conductive, thereby removing the base drive to transistors 170 and 180, thereby turning off the clamp.

Figure 6:
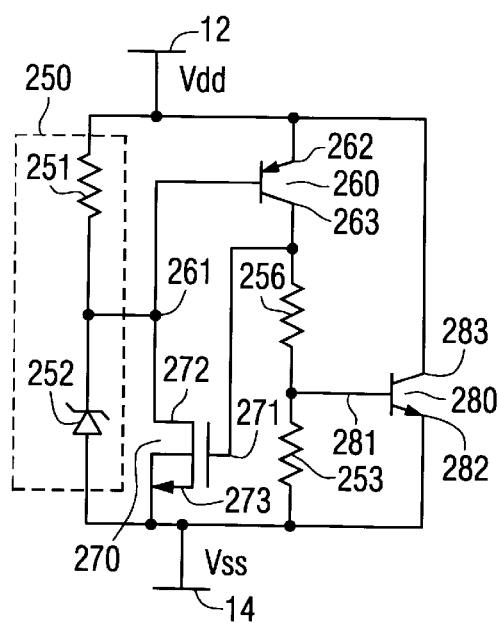
FIG. 6 diagrammatically illustrates a Schmitt trigger-configured IC protection circuit in accordance with a third, BiMOS-configured embodiment of the present invention for DC mode of operation.

FIG. 6 diagrammatically illustrates a Schmitt trigger-configured IC protection circuit in accordance with a third BiMOS-configured embodiment of the present invention designed for DC operation. As shown therein, as in the embodiments of FIG. 4, an input resistor 251 of a voltage divider/clamping circuit 250 is coupled between the Vdd supply rail 12 and an input node 261 at the base of a bipolar PNP transistor 260. A voltage reference device 252, again shown as a Zener diode, is coupled between the input node 261 and the Vss voltage supply rail 14, and is employed to define a prescribed voltage level relative to the supply rail differential at which the Schmitt trigger circuit is activated into the clamping mode.

As in the DC embodiment of FIG. 5, PNP transistor 260 has its emitter 262 coupled to the Vdd supply rail 12. Its collector 263 is coupled directly to the gate 271 of a N-MOSFET 270 and through a resistor 256 to the base 281 of an NPN transistor 280. Resistor 256 provides the necessary voltage divider offset to satisfy the respective turn-on voltage requirements of N-MOSFET 270 and NPN transistor 280. The base 281 of transistor 280 is further coupled through a bias resistor 253 to the Vss supply terminal 14. The emitter 282 of NPN transistor 280 is coupled to the Vss supply rail 14. The drain 272 of N-MOSFET 270 is coupled to node 261, while the source 273 of N-MOSFET 270 is coupled to the Vss supply rail 14.

As in the previous embodiments, as a non-limiting example, the value of the Vdd supply voltage for PNP transistor 260 to turn-on hard may be such that PNP transistor 260 turns on at 0.7 volts above the Zener voltage of Zener diode 252. As in the DC embodiment of FIG. 5, N-MOSFET 270 is used as a switched low impedance device that forms a voltage divider with resistor 251 during the active state of the clamping circuit. The characteristics of N-MOSFET 270 are such that the supply rail voltage differential at which PNP transistor is turned off is less than that for activating the clamping circuit, so that the Schmitt trigger clamp has the intended turn-on, turn-off hysteresis switching characteristic.

Like the clamping NPN transistor 180 in the embodiment of FIG. 5, NPN transistor 280 is a large current device, having its collector-emitter coupled between the Vdd supply rail 12 and the Vss supply rail 14, and functions as the principal clamping element during the active state of the ESD protection circuit. The large current drive provided by NPN transistor 280 pulls current out of the power supply and clamps the power supply voltage to a value determined by the internal impedance of the NPN transistor 280.

In operation, in the absence of an overvoltage condition, PNP transistor 260 is initially non-conductive, keeping the gate voltage to N-MOSFET 270 less than its turn on threshold Vt, and the base-emitter junction of NPN transistor 280 at zero bias, and thereby its clamping action turned off. During this non-clamping state, the voltage at input node 261 tracks the supply rail voltage up to the Zener value of Zener diode 252 and is then clamped at that value by the diode 252. As long as the supply rail differential is less than the Vbe at which PNP transistor 260 turns-on plus the Zener voltage of Zener diode 252, PNP transistor 260 remains turned-off, and the clamping action of the protection circuit is not activated.

For an excessive overvoltage condition, however, the voltage difference between power supply terminals 12 and 14 will increase to the point that the voltage at input node 261 eventually reaches a value which provides a hard forward bias drive to PNP transistor 260, so that the collector output of PNP transistor 260 provides a hard drive to the gate 271 of N-MOSFET 270 and the base 281 of NPN transistor 280, turning-on each of these devices hard. When this happens, the large current drive provided by NPN transistor 280 pulls current out of the power supply and clamps the power supply voltage to a value determined by the collector-emitter impedance of NPN transistor 280. At the same time, since N-MOSFET 270 is turned-on it inserts a low impedance in series with resistor 251, thereby reducing the value to which the supply differential voltage must drop in order to turn off the clamping action.

When the overvoltage condition that has given rise to the dynamic clamping action terminates, the supply rail differential voltage will decrease. Because N-MOSFET 270 is currently turned-on, it provides a low impedance that is part of a voltage divider with resistor 251. As pointed out above, the characteristics of the N-MOSFET 270 are such that PNP transistor 260 will turn-off at a supply rail differential that is less than that for turning on the clamping circuit. Thus, N-MOSFET 270 causes the clamping circuit's switching characteristic to have the intended hysteresis (turning on at a higher supply rail differential than that at which it turns off). Once the supply voltage drops to a level that reduces the voltage at node 261 to the reduced switching threshold, PNP transistor 260 is rendered non-conductive and the clamping action of the protection circuit is terminated.

As pointed out briefly above, an ESD pulse, such as that generated by a human body, electrical machinery, etc., typically has a very fast rise time (e.g., on the order of hundreds of picoseconds to several or ten nanoseconds) and a very large amplitude (which may be on the order of several thousand volts). In accordance with transient mode embodiments of the invention, to be described below with reference to FIGS. 7–9, the switching components of the hysteresis-based protection circuit are AC-coupled to the power supply rails through a time constant network (a resistor—capacitor RC) network. This RC network is operative to cause the protection circuit to be triggered or turned on in response to a very fast, high amplitude ESD pulse, but thereafter shuts down the clamping action of the circuit after the overvoltage pulse drops below the reduced hysteresis threshold or at the expiration of a prescribed time interval corresponding to the time constant of the RC network, whichever occurs first. Incorporating a time-out controlled recovery or turn-off action as an adjunct to the hysteresis-defined turn-off condition, is very effective in preventing circuit damage or destruction as a result of prolonged power dissipation in the clamping state.

Figure 7:
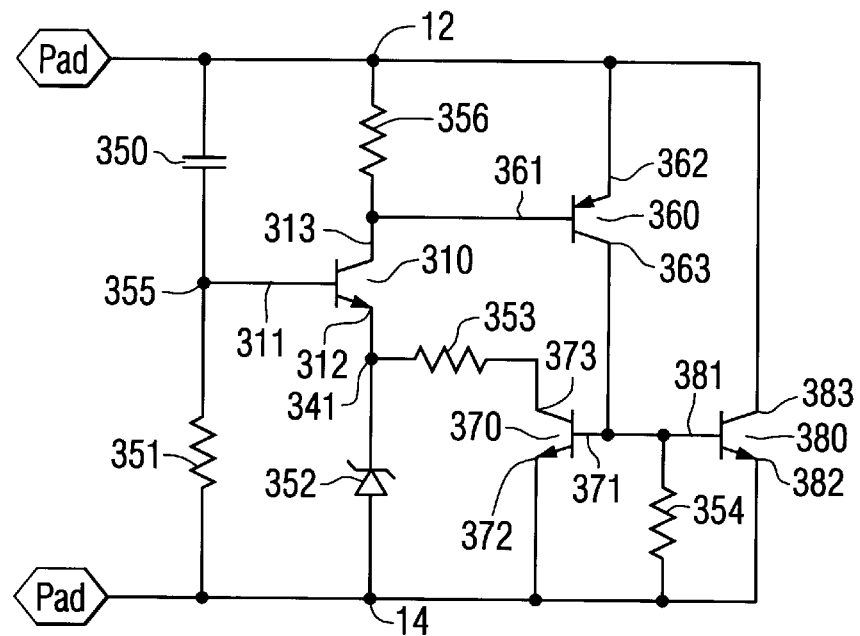
FIG. 7 diagrammatically illustrates a Schmitt trigger-configured IC protection circuit in accordance with a fourth, bipolar-configured embodiment of the present invention for transient mode of operation.

FIG. 7 diagrammatically illustrates a Schmitt trigger-configured IC protection circuit in accordance with a bipolar-configured embodiment of the present invention, that is similar to the DC bipolar-configured embodiment of FIG. 5, but which is designed for transient mode operation. As shown therein, an AC coupling circuit in the form of a capacitor—resistor (RC) network, formed of an ESD transient-coupling capacitor 350 and a resistor 351, is coupled between the Vdd supply rail 12 and the Vss supply rail 14. The common connection or junction 355 of capacitor 350 and resistor 351 is coupled to the base 311 of an NPN transistor 310, having its emitter 312 coupled through a clamping activation reference device, shown as voltage Zener diode 352, to the Vss supply terminal 14. The collector 313 of NPN transistor 310 is coupled through a bias resistor 356 to the Vdd supply terminal 12. Similar to the DC embodiment of FIG. 5, the Zener voltage of Zener diode 352 (plus the Vbe diode drop in NPN transistor 310) defines a prescribed input node 355 voltage level relative to the Vss supply 14 differential at which the Schmitt trigger circuit is activated into the clamping mode.

The collector 313 of NPN transistor 310 is further coupled to the base 361 of a bipolar PNP transistor 360. As in the DC embodiment of FIG. 5, PNP transistor 360 has its emitter 362 coupled to the Vdd supply rail 12 and its collector 363 coupled to the bases 371 and 381 of each of NPN transistors 370 and 380, respectively. The respective emitters 372 and 382 of NPN transistors 370 and 380 are coupled to the Vss supply rail 14. The collector 373 of NPN transistor 370 is coupled through a collector resistor 353 to the common connection of the emitter 312 of NPN transistor 310 and Zener diode 352, while the commonly connected bases 371 and 381 of NPN transistors 370 and 380 are coupled to through a bias resistor 354 to the Vss supply rail 14.

As in the DC bipolar embodiment of FIG. 5, the value of the supply voltage 12 for PNP transistor 360 to turn on hard is the Vbe voltage of PNP transistor 360 required for turn-on plus the $V_{CE}$ of transistor 310, plus the Zener voltage of Zener diode 352 (e.g., Vbe=0.7V for PNP transistor 360 plus $V_{CE}$=0.5V for NPN transistor 310, plus $V_{Zener}$=5V for Zener diode 352 is equal to 6.2V). NPN transistor 370 is used as a switched low impedance device to connect the emitter of transistor 310 to the Vss supply 12 through resistor 353 during the active state of the clamping circuit. The $V_{SAT}$ of NPN transistor 370, resistor 353, and $V_{SAT}$ of NPN transistor 310 are such that the supply rail voltage differential at which the PNP transistor 360 is turned-off is less than that for activating the clamping circuit, so that the Schmitt trigger protection circuit has the intended hysteresis switching characteristic, as described above.

Again, NPN transistor 380 is a large current device, having its collector-emitter coupled between the Vdd supply rail 12 and the Vss supply rail 14, and serving as the principal clamping element during the active state of the ESD protection circuit. When the protection circuit is activated by a large amplitude, fast rise time overvoltage (ESD) pulse, the large current drive provided by NPN transistor 380 pulls current out of the power supply and clamps the power supply voltage to a value determined by the internal impedance of the NPN transistor 380.

In the absence of an excessive overvoltage transient, NPN transistor 310 is turned-off, so that the remaining circuit switch components are turned-off, or non-conductive. When an ESD pulse is coupled through the capacitor 350 of the RC input network, it will drive NPN transistor 310 on hard. This, in turn will cause the voltage at node 341 to rapidly rise to the reference turn-on voltage of the Zener voltage of Zener diode 352. The base 361 of PNP transistor 360 is clamped by $V_{CE}$ of the NPN transistor 310, causing the PNP transistor 360 to turn-on hard. The collector current of transistor 360 supplies a substantial drive to the bases of NPN transistors 370 and 380, turning these devices on hard.

As a consequence, the large current drive provided by NPN transistor 380 pulls current out of the power supply and clamps the power supply voltage to a value determined by the collector-emitter impedance of NPN transistor 380. At the same time, the turn-on of NPN transistor 370 inserts a low impedance positive feedback circuit, formed of the collector-emitter resistance of transistor 370 and the resistance of resistor 353. Since this feedback circuit is in series with the emitter 312 of NPN transistor 310, whose collector 313 is connected to base 361 of transistor 360 and the collector 363 of transistor 360 is connected to the base 371 of transistor 370, what results may be considered a 'pseudo' SCR (silicon controlled rectifier) action, with a controlled switch (NPN transistor 310 and resistor 353) in the regenerative feedback path.

This positive feedback circuit serves to set the turn-off of the clamping circuit at a lower (turn-off) threshold than the turn-on threshold (established by the Zener voltage of Zener diode 352 and the Vbe of transistor 310). The charging of the capacitor 350 ensures that the clamping action of the protection circuit is effective for only a prescribed period of time. As noted above, the clamping action is terminated when the overvoltage condition drops below the reduced turn-off threshold, or at the expiration of the time-out established by the time constant of the RC network. This serves to prevent an overvoltage condition that does not subside to the lower threshold voltage within the time constant period, from causing circuit damage or destruction that might otherwise result from prolonged power dissipation in the clamping state.

Figure 8:
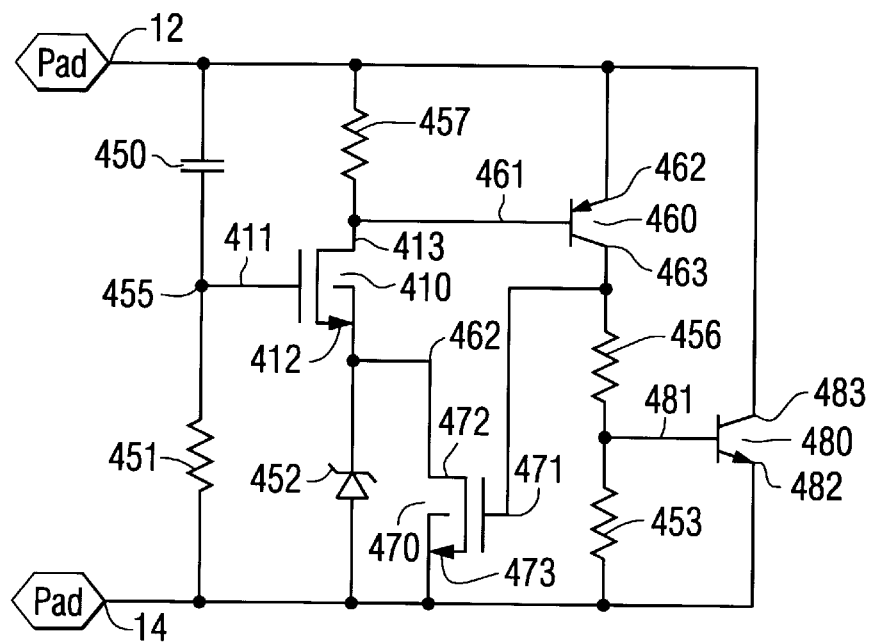
FIG. 8 diagrammatically illustrates a Schmitt trigger-configured IC protection circuit in accordance with a fifth, BiMOS-configured embodiment of the present invention for transient mode of operation.

FIG. 8 diagrammatically illustrates a Schmitt trigger-configured IC protection circuit in accordance with a BiMOS-configured embodiment of the present invention, similar to the DC BiMOS-configured embodiment of FIG. 6, but which is designed for transient mode operation. As shown therein, as in the transient mode embodiment of FIG. 7, an AC input circuit in the form of a capacitor—resistor (RC) network, formed of an ESD transient-coupling capacitor 450 and a resistor 451, is coupled between the Vdd supply rail 12 and the Vss supply rail 14. A common connection 455 of capacitor 450 and resistor 451 is coupled to the gate 411 of a N-MOSFET 410, having its source 412 coupled through a clamping activation reference device, shown as voltage Zener diode 452, to the Vss supply terminal 14. The drain 413 of N-MOSFET 410 is coupled through a bias resistor 457 to the Vdd supply terminal 12. Similar to the fourth embodiment of FIG. 7, Zener diode 452, plus the $V_{DS}$ of N-MOSFET 410, and the Vbe of transistor 460 are employed to define a prescribed voltage level relative to the supply rail differential at which the Schmitt trigger circuit is activated into the clamping mode.

The drain 413 of N-MOSFET 410 is further coupled to base 461 of a bipolar PNP transistor 460. As in the transient mode embodiment of FIG. 7, a voltage reference device 452, is again shown as a Zener diode. The Zener diode 452 is coupled between the source 412 of transistor 410 and the Vss voltage supply rail 14, and is employed to define a prescribed voltage level relative to the supply rail differential at which the Schmitt trigger circuit is activated into the clamping mode. PNP transistor 460 has its emitter 462 coupled to the Vdd supply rail 12. Its collector 463 is coupled directly to the gate 471 of a N-MOSFET 470 and through a resistor 456 to the base 481 of an NPN clamp transistor 480. Resistor 456 provides the necessary voltage divider offset to satisfy the respective turn-on voltage requirements of N-MOSFET 470 and NPN transistor 480.

The base 481 of transistor 480 is further coupled through a bias resistor 453 to the Vss supply terminal 14. The emitter 482 of NPN transistor 480 is coupled to the Vss supply rail 14. The drain 472 of N-MOSFET 470 is coupled to the common connection of the source 412 of N-MOSFET 410 and Zener diode 452; the source 473 of N-MOSFET 470 is connected to the Vss supply rail 14.

Resistor 451 keeps node 455 at the supply rail voltage Vss when N-MOSFET 410 is turned-off. When the voltage at node 455 is sufficient to turn N-MOSFET 410 on, a voltage divider is formed by the on-resistance of N-MOSFET 410, resistor 457 and Zener diode 452. The voltage at node 462 can rise until it reaches the Zener voltage of Zener diode 452, whereupon Zener diode 452 will clamp node 462 at the Zener voltage. As the voltage at node 455 continues to increase, the on-resistance of N-MOSFET 410 will continue to decrease. The voltage divider formed by the on-resistance of N-MOSFET 410 and resistor 457 will develop a voltage sufficient to turn-on PNP transistor 460.

As in the DC bipolar embodiment of FIG. 5, N-MOSFET 470 is used as a switched, low impedance device that forms a voltage divider with the on-resistance of N-MOSFET 410 during the active state of the clamping circuit. Again, the characteristics of the N-MOSFET 470 are such that the supply rail voltage differential at which PNP transistor is turned off is less than that for activating the clamping circuit, causing the Schmitt trigger to have the intended hysteresis switching characteristic.

Again, NPN transistor 480 is a large current device, having its collector-emitter coupled between the Vdd supply rail 12 and the Vss supply rail 14, and functions as the principal clamping element during the active state of the power supply clamp circuit. The large current drive provided by NPN transistor 480 pulls current out of the power supply and clamps the power supply voltage to a value determined by the internal impedance of the NPN transistor 480.

In the absence of an overvoltage transient, N-MOSFET 410 is turned off, so that the remaining circuit switch components are turned off, or non-conductive. However, an ESD pulse will be coupled through the capacitor 450 of the RC input network, and drive N-MOSFET 410 on hard. This, in turn will cause the voltage at the node 462 to rapidly increase, following the ESD pulse, until clamped at the Zener voltage of diode 452. The reference turn-on voltage is set by the sum of the Zener voltage of Zener diode 452, the on-resistance of N-MOSFET 410 and resistor 457. This turns-on PNP transistor 460 hard, thereby supplying substantial collector output drive to turn-on each of the transistors 470 and 480 hard. The large current drive provided by NPN transistor 480 pulls current out of the power supply and clamps the power supply voltage to a value determined by the collector-emitter impedance of NPN transistor 480.

At the same time, the turn on of N-MOSFET 470 inserts a low impedance positive feedback circuit, formed of the on-resistance of N-MOSFET 470 and the on-resistance of N-MOSFET 410, to the common connection of resistor 457 and the base 461 of PNP transistor 460. This positive feedback circuit serves to control turning-off of the clamping circuit at a lower (turn-off) threshold than the turn-on threshold (established by the Zener voltage of Zener diode 452 and the on-resistance of N-MOSFET 410). In addition, as in the bipolar transient mode embodiment of FIG. 7, the RC network ensures that the clamping action of the protection circuit is effective for only a prescribed period of time associated with the charging of capacitor 450, as governed by the time constant of the RC network, even if the overvoltage condition does not subside to the lower threshold voltage within that time period. As pointed out above, this prevents circuit damage or destruction that might otherwise result from prolonged power dissipation in the clamping state.

Figure 9:
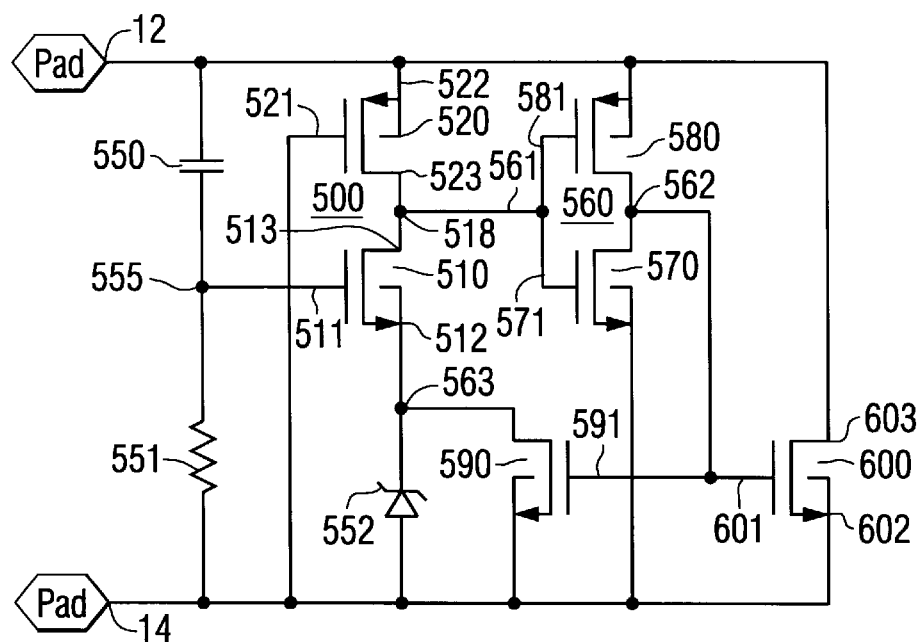
FIG. 9 diagrammatically illustrates a Schmitt trigger-configured IC protection circuit in accordance with a sixth, CMOS-configured embodiment of the present invention for transient mode of operation.

FIG. 9 diagrammatically illustrates a Schmitt trigger-configured IC protection circuit in accordance with a CMOS-configured embodiment of the present invention, similar to the DC CMOS-configured embodiment of FIG. 4, but which is designed for transient mode operation. As in the transient mode embodiments of FIGS. 7 and 8, an AC coupling circuit in the form of a capacitor—resistor (RC) network, formed of an ESD transient-coupling capacitor 550 and a resistor 551, is coupled between the Vdd supply rail 12 and the Vss supply rail 14. A common connection 555 of capacitor 550 and resistor 551 is coupled to the gate 511 of a N-MOSFET 510 of an inverter 500.

N-MOSFET 510 has its source 512 coupled at node 563 through a clamping activation reference device, shown as voltage Zener diode 552, to the Vss supply terminal 14. The drain 513 of N-MOSFET 510 is coupled to node 561 and the drain 523 of a load P-MOSFET 520, the source 522 of which is coupled to the Vdd supply terminal 12. The gate 521 of P-MOSFET 520 is connected directly to the Vss supply terminal 14. Coupling the gate 521 of load P-MOSFET 520 to the Vss supply terminal serves to provide a gate drive to P-MOSFET 520, so that it acts as a pseudo resistor source of current for N-MOSFET 510. This ensures that as N-MOSFET 510 is turned-on, node 561 will not be pulled low as the capacitance on node 563 is charged through N-MOSFET 510. P-MOSFET 520 provides the charging current to keep node 561 high until the Zener voltage of Zener diode 552 is reached and node 563 is clamped at the Zener voltage. A voltage divider is formed by the on-resistances of N-MOSFET 510 and P-MOSFET 520, between Vdd and node 563. As Vdd increases inverter 560 will switch, activating the clamping circuit. As in the transient mode embodiment of FIG. 8, the Zener diode 552 (plus the on-resistance of N-MOSFET 510 and P-MOSFET 520) are employed to define a prescribed voltage level relative to the supply rail differential at which the Schmitt trigger circuit is activated into the clamping mode.

The junction 518 of the drains 513 and 523 of respective N-MOSFET 510 and P-MOSFET 520 is coupled to an input node 561 of a CMOS inverter 560. As in the DC mode embodiment of FIG. 4, CMOS inverter 560 is comprised of an N-MOSFET transistor 570 and a P-MOSFET transistor 580, having their drain-source current flow paths coupled in series between the Vdd supply rail 12 and Vss supply rail 14. Inverter MOSFETs 570 and 580 have their respective gates 571, 581 connected in common to input node 561; a commonly connected drain output node 562 of MOSFETs 570 and 580 is coupled to the gates 591 and 601 of respective N-MOSFETs 590 and 600.

N-MOSFET 590 has its drain-source path coupled between the source 512 of N-MOSFET 510 and the Vss supply rail 14, and is used as a switched low impedance device that forms a voltage divider with the on-resistances of N-MOSFET 510 and P-MOSFET 520 during the active state of the clamping circuit. As described above, the characteristics of the N-MOSFET 590 are such that the supply rail voltage differential at which CMOS inverter 560 switches is less than that for activating the clamping circuit, causing the Schmitt trigger to have the intended hysteresis switching characteristic.

As in the DC mode embodiment of FIG. 4, N-MOSFET 600 is a large geometry device, having its drain-source path coupled between the Vdd supply rail 12 and the Vss supply rail 14. When turned-on hard in the active clamping state, N-MOSFET 600 serves to effectively pull current out of the power supply and clamp the power supply voltage to a value determined by the low impedance of N-MOSFET 600.

In operation, in the absence of a transient overvoltage event, N-MOSFET 510 is turned-off, so that the MOSFETs 580, 590, and 600 are turned-off, or non-conductive. However, a large amplitude ESD pulse will be coupled through the capacitor 550 of the RC input network, and drive N-MOSFET 510 on hard. Turning on N-MOSFET 510 hard, in turn, will cause the voltage at node 563 to increase until clamped by Zener diode 552. P-MOSFET 520 and N-MOSFET 510 form a voltage divider between Vdd and node 563. As Vdd continues to increase, node 561 will eventually reach the switching point of CMOS inverter 560, causing the voltage at the node 562 to change state (go high), thereby turning on each of N-MOSFETs 590 and 600 hard.

As noted above, the large current drive provided by N-MOSFET 600 pulls current out of the power supply and clamps the power supply voltage to a value determined by the relatively low impedance of N-MOSFET 600. At the same time, the turn-on of N-MOSFET 590 inserts a low impedance positive feedback circuit, formed of the on-resistance of N-MOSFET 590 and the on-resistance of N-MOSFET 510, to the common connection 518 of the drains 513 and 523. This positive feedback circuit serves to control turn-off of the clamping circuit at a lower (turn-off) threshold than the turn-on threshold (established by the Zener voltage of Zener diode 552 and the on-resistance of N-MOSFET 510).

In addition, as in the bipolar transient mode embodiment of FIG. 7, the time constant of the RC network ensures that the clamping action of the protection circuit is effective for only a prescribed period of time, even if the overvoltage condition does not subside to the lower threshold voltage within that time period. As pointed out above, this feature prevents circuit damage or destruction that might otherwise result from prolonged power dissipation in the clamping state.

Figures 10, 11, 12:
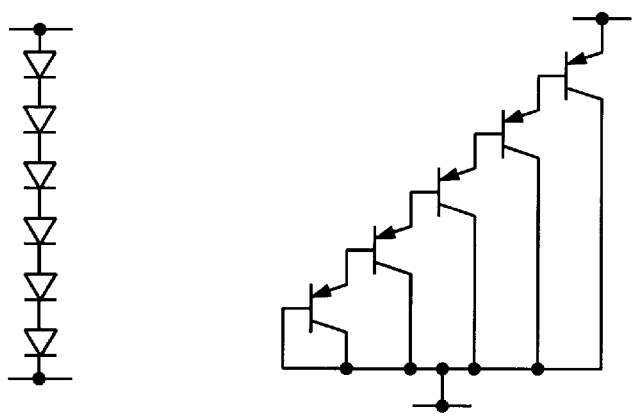
FIG. 10 shows a clamp threshold circuit formed of a serial string of diodes.
FIG. 11 shows a clamp threshold circuit formed of a cascaded arrangement of Darlington-connected transistors.
FIG. 12 shows a clamp threshold circuit formed of an emitter-collector punch through connected transistor arrangement.

It should be noted that the use of a Zener diode as the clamping threshold reference device in the embodiments of FIGS. 4–9 is a non-limiting example. Any other implementation of a voltage reference may be employed as long as it provides a voltage reference that is independent of the supply voltage. Non-limiting examples of other voltage reference configurations are diagrammatically illustrated in FIGS. 10–12, which respectively show a serial string of diodes (FIG. 10), a cascaded arrangement of Darlington-connected transistors (FIG. 11) and an emitter-collector punch-through-connected transistor (FIG. 12). For each of these and other functionally equivalent voltage reference implementations, the voltage reference will be governed only by circuit manufacture processing and device geometry parameters, making operation of the clamping circuit independent of the power supply voltage.

As will be appreciated from the foregoing description, the previously described problems of conventional ESD protection circuits are effectively obviated by a Schmitt trigger-configured overvoltage clamping circuit in accordance with the present invention, which has a hysteresis turn-on, turn-off characteristic that minimizes its sensitivity to noise, and is effective to protect an integrated circuit against a DC overvoltage condition, and electrostatic discharge-based transients, while allowing 'hot' insertion of a device containing the clamping circuit into an already powered-up system.

Advantageously, the overvoltage protection circuit employs a reference device, such as a Zener diode, that enables the clamping circuit trigger threshold to be set at a value that is independent of the power supply voltage, since the voltage reference depends only on circuit manufacture processing and device geometry parameters. The clamping circuit of the present invention may be configured for either DC mode operation or transient mode operation.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A method of protecting a circuit against an overvoltage condition comprising the steps of:
    (a) monitoring a differential voltage between prescribed locations of said circuit;
    (b) in response to said differential voltage exceeding a first voltage condition as established by a first threshold voltage of a first voltage reference circuit element, coupling a clamping device in circuit with said prescribed locations of said circuit; and
    (c) decoupling said clamping device from said prescribed locations of said circuit, in response to said differential voltage not being reduced below a second voltage condition as established by a second threshold voltage less than said first threshold voltage within a prescribed period of time of step (b) detecting that said differential voltage has exceeded said first voltage condition.

2. A method according to claim 1, wherein step (c) further comprises decoupling said clamping device from said prescribed locations of said circuit, in response to said differential voltage being reduced below said second voltage condition.

3. A method according to claim 1, wherein, in step (c), said second threshold voltage is established by a second voltage reference circuit element.

4. A method according to claim 1, wherein said prescribed locations of said circuit comprise power supply links for said circuit, and wherein said first voltage condition corresponds to a first differential voltage between said power supply links exceeding a difference between normal power supply voltages of said power supply links.

5. A method according to claim 4, wherein said second voltage condition corresponds to a second differential voltage between said power supply links less than said first differential voltage and also exceeding said difference between normal power supply voltages of said power supply links.

6. A method according to claim 1, wherein step (a) comprises monitoring said differential voltage by means of a Schmitt trigger-configured clamping circuit, that contains said clamping circuit and said first voltage reference circuit element, and is coupled to said prescribed locations of said circuit.

7. A method according to claim 6, wherein said Schmitt trigger-configured clamping circuit further includes a second voltage reference circuit element that establishes said second threshold voltage in step (c).

8. A protection circuit for protecting a circuit from an overvoltage condition, comprising a clamping circuit configured for transient mode operation having a hysteresis turn-on, turn-off characteristic that is established exclusive of conditions of prescribed locations of said circuit, and which is operative to monitor a differential voltage between said prescribed locations of said circuit, and to controllably couple a clamping device in circuit with said prescribed locations of said circuit, in accordance with a prescribed relationship between said differential voltage and said hysteresis turn-on, turn-off characteristic, and wherein said clamping circuit is operative to couple said clamping device in circuit with said prescribed locations of said circuit, in response to said differential voltage exceeding a first voltage associated with a turn-on threshold of said hysteresis turn-on, turn-off characteristic, and to decouple said clamping device from said prescribed locations of said circuit, in response to said differential voltage failing to be reduced below a second voltage associated with a turn-off threshold of said hysteresis turn-on, turn-off characteristic within a prescribed period of time of said differential voltage exceeding said first voltage.

9. A protection circuit according to claim 8, wherein said prescribed locations of said circuit comprise power supply links for said circuit.

10. A protection circuit according to claim 8, wherein said clamping circuit is configured of bipolar circuit components.

11. A protection circuit according to claim 8, wherein said clamping circuit is configured of CMOS circuit components.

12. A protection circuit according to claim 8, wherein said clamping circuit is configured of BiMOS circuit components.

13. A protection circuit according to claim 8, wherein said clamping circuit has a turn-on threshold established by a first voltage reference circuit element of said clamping circuit, and a turn-off threshold established by a second voltage reference circuit element of said clamping circuit.

14. A protection circuit according to claim 13, wherein said prescribed locations of said circuit comprise power supply links for said circuit, and wherein said turn-on threshold is associated with a first differential voltage between said power supply links exceeding a difference between normal power supply voltages of said power supply links, and wherein said turn-off threshold is associated with a second differential voltage between said power supply links less than said first differential voltage and also exceeding said difference between normal power supply voltages of said power supply links.

15. A protection circuit, for protecting a circuit from an overvoltage condition, comprising a clamping circuit having a hysteresis turn-on, turn-off characteristic that is established exclusive of conditions of prescribed locations of said circuit, and which is operative to monitor a differential voltage between said prescribed locations of said circuit, and to controllably couple a clamping device in circuit with said prescribed locations of said circuit, in accordance with a prescribed relationship between said differential voltage and said hysteresis turn-on, turn-off characteristic, and wherein said clamping circuit comprises a voltage divider/clamp reference circuit coupled to said prescribed locations of said circuit, including a first voltage reference circuit element of said clamping circuit coupled to an input node of a switched driver circuit, said first voltage reference circuit element establishing a turn-on threshold of said hysteresis characteristic of said clamping circuit, said switched driver circuit having output coupled to each of said clamping device and a second voltage reference circuit element of said clamping circuit, said second voltage reference circuit element being coupled to said input node, and establishing a turn-off threshold of said of said hysteresis characteristic of said clamping circuit, and wherein said voltage divider/clamp reference circuit includes a time constant network which is operative to turn on said switched driver in response to said differential voltage exceeding a first voltage associated with said turn-on threshold of said hysteresis characteristic, and to turn off said switched driver in the absence of said differential voltage being reduced below a second voltage associated with a turn-off threshold of said hysteresis characteristic, within a prescribed period of time of said differential voltage exceeding said first voltage.

16. A protection circuit according to claim 15, wherein each of said clamping device and said second voltage reference circuit element includes a switched semiconductor element.

17. A Schmitt trigger circuit comprising a voltage divider containing a first voltage reference circuit element, and arranged to be coupled to first and second voltage nodes, said first voltage reference circuit element being coupled to an input node of a switched driver circuit, and establishing a turn-on threshold of a hysteresis characteristic of said Schmitt trigger circuit, said switched driver circuit having an output coupled to each of a clamping device and a second voltage reference circuit element, said clamping device being arranged to be coupled to said first and second voltage nodes, and said second voltage reference circuit element being coupled to said input node, and being operative to establish a turn-off threshold of said hysteresis characteristic, and wherein said voltage divider includes a time constant network which is operative to turn-on said switched driver in response to a differential voltage between said first and second voltage nodes exceeding a first voltage associated with said turn-on threshold of said hysteresis characteristic, and to turn-off said switched driver in the absence of said differential voltage being reduced below a second voltage associated with a turn-off threshold of said hysteresis characteristic, within a prescribed period of time of said differential voltage exceeding said first voltage.

18. A Schmitt trigger circuit according to claim 17, wherein each of said clamping device and said second voltage reference circuit element includes a switched semiconductor element.

19. A Schmitt trigger circuit according to claim 17, wherein said first and second voltage nodes comprise power supply links.

20. A single port device comprising a control portion and a clamp portion, said control portion having a hysteresis characteristic that controls said clamp portion, said clamp portion being operative to clamp said port, and wherein said control portion has a timed turn-off.

* * * * *